(12) United States Patent
Rizzoli et al.

(10) Patent No.: US 7,299,726 B2
(45) Date of Patent: Nov. 27, 2007

(54) METHOD AND UNIT FOR TRANSVERSELY CUTTING CIGARETTE PORTIONS OR SIMILAR ON A FILTER ASSEMBLY MACHINE

(75) Inventors: Salvatore Rizzoli, Bologna (IT); Stefano Balotta, Zola Predosa (IT); Fiorenzo Draghetti, Medicina (IT)

(73) Assignee: G.D Societa' per Azioni, Bologna (IT)

( * ) Notice: Subject to any disclaimer, the term of this patent is extended or adjusted under 35 U.S.C. 154(b) by 401 days.

(21) Appl. No.: 10/991,334

(22) Filed: Nov. 17, 2004

(65) Prior Publication Data

US 2005/0126354 A1    Jun. 16, 2005

(30) Foreign Application Priority Data

Nov. 21, 2003  (IT) .......................... BO2003A0705

(51) Int. Cl.
*A24C 5/28* (2006.01)
*B23D 35/00* (2006.01)
*B23Q 3/157* (2006.01)

(52) U.S. Cl. .................. 83/13; 83/411.3; 83/481; 83/954; 131/84.4; 483/1; 483/30; 483/54; 483/59

(58) Field of Classification Search ............... 83/411.3, 83/481, 563, 564, 571, 954; 30/40, 40.1, 30/40.2, 536, 541; 131/84.4, 280; 483/1, 483/16, 28, 30, 31, 36, 38, 49, 54–56, 58, 483/59, 61–64; 700/179
See application file for complete search history.

(56) References Cited

U.S. PATENT DOCUMENTS

| | | | |
|---|---|---|---|
| 4,554,931 A | | 11/1985 | Born |
| 4,584,759 A | * | 4/1986 | Bleich .......................... 483/10 |
| 5,318,496 A | * | 6/1994 | Takahashi ...................... 483/1 |
| 5,478,301 A | * | 12/1995 | Takahashi ..................... 483/11 |
| 6,520,895 B2 | * | 2/2003 | Senga et al. ................... 483/1 |
| 2001/0018857 A1 | * | 9/2001 | Laroche ...................... 83/564 |
| 2002/0052271 A1 | | 5/2002 | Schicke |
| 2002/0173413 A1 | * | 11/2002 | Pallmann ...................... 483/1 |
| 2003/0050161 A1 | * | 3/2003 | Jander ......................... 483/54 |
| 2004/0235628 A1 | * | 11/2004 | Schicke ......................... 483/1 |

FOREIGN PATENT DOCUMENTS

EP       1213105       6/2002
WO     90/03242       4/1990

* cited by examiner

*Primary Examiner*—Clark F. Dexter
(74) *Attorney, Agent, or Firm*—Ladas & Parry LLP

(57) ABSTRACT

A method and unit for transversely cutting cigarette portions or similar on a filter assembly machine, whereby a cigarette portion is fed transversely through a cutting station to intercept a rotary circular blade, which is maintained in a work position by an arm mounted to oscillate about an axis parallel to the axis of rotation of the circular blade, so as to move the circular blade between the work position, a store for worn circular blades, and a store for new circular blades.

21 Claims, 6 Drawing Sheets

METHOD AND UNIT FOR TRANSVERSELY CUTTING CIGARETTE PORTIONS OR SIMILAR ON A FILTER ASSEMBLY MACHINE

The present invention relates to a method and unit for transversely cutting cigarette portions or similar on a filter assembly machine.

BACKGROUND OF THE INVENTION

On a known filter assembly machine, first elongated members, each defined by a double cigarette portion, are each cut transversely by a first cutting unit into two single portions; the single portions are then parted axially, are separated by a double filter, and are connected to each other and to the filter by a gummed band to form a double cigarette, which is cut transversely at the filter by a second cutting unit into two single filter-tipped cigarettes.

At each cutting unit, the cigarette portions are supplied transversely (i.e. in a direction perpendicular to their longitudinal axis) by a conveyor drum fitted with a circular blade rotating at high speed. To ensure a clean cut at all times, each cutting unit is fitted with a sharpening device, e.g. of the type described in U.S. Pat. No. 4,497,143-A1, for maintaining a keen blade edge. In view of the high output speeds of modern filter assembly machines (as many as 20,000 cigarettes a minute), continual sharpening subjects the circular blades of the cutting units to severe wear, thus requiring frequent replacement. In particular, the circular blade of the first cutting unit wears out faster than that of the second, by cutting the cigarette portions at the tobacco, whereas the circular blade of the second cutting unit cuts the cigarette portions at the filter material, which on average is softer and more homogeneous than tobacco.

In a high-speed, last-generation filter assembly machine capable of producing up to 20,000 cigarettes a minute, the circular blade of the first cutting unit must be changed at the end of each shift, i.e. every 8 operating hours. And since this calls for skilled labour and involves a certain amount of downtime (5-10 minutes), the frequency with which the circular blade of the first cutting unit must be changed obviously increases cost, in terms of both labour and downtime production loss.

SUMMARY OF THE INVENTION

It is an object of the present invention to provide a method and unit for transversely cutting cigarette portions or similar on a filter assembly machine, designed to eliminate the aforementioned drawbacks, and which, at the same time are cheap and easy to implement.

According to the present invention, there is provided a method of transversely cutting cigarette portions or similar on a filter assembly machine; the method comprising feeding a cigarette portion transversely through a cutting station to intercept a circular blade rotating continuously about a first axis parallel to the cigarette portion; and the method being characterized by the circular blade being supported by an arm mounted to move between a work position, in which the circular blade cuts the cigarette portions; an unloading position facing a first store for worn circular blades, and in which the circular blade is unloaded by the arm; and a feed position facing a second store for new circular blades, and in which a new circular blade is withdrawn by the arm.

According to the present invention, there is provided a unit for transversely cutting cigarette portions or similar on a filter assembly machine; the unit comprising a rotary circular blade rotating continuously about a first axis and located at a cutting station, and a conveyor for transversely feeding a cigarette portion, positioned parallel to the first axis, through the cutting station to intercept the rotary circular blade; the unit being characterized by comprising a first store for worn circular blades; a second store for new circular blades; an arm supporting the circular blade; and actuating means for moving the arm between a work position, in which the circular blade cuts the cigarette portions, an unloading position facing the first store, and in which the circular blade is unloaded by the arm, and a feed position facing the second store, and in which a new circular blade is withdrawn by the arm.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
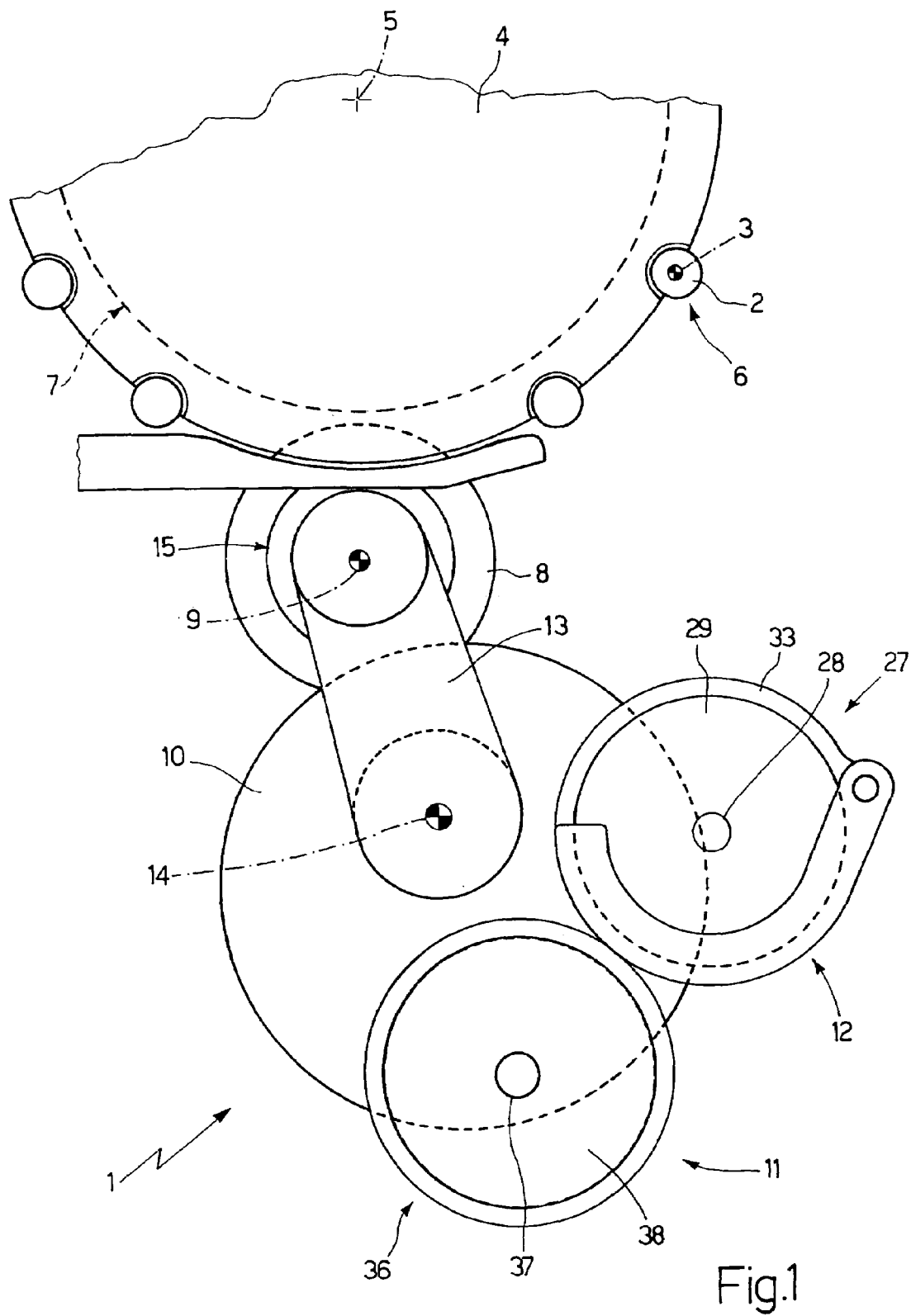
FIG. 1 shows a schematic side view of a preferred embodiment of a cutting unit in accordance with the present invention.

With reference to the accompanying drawings, number 1 indicates as a whole a cutting unit of a filter assembly machine (not shown). More specifically, cutting unit 1 provides for cutting cigarette portions 2, each of which has a longitudinal axis 3 of symmetry, and is fed transversely (i.e. in a direction crosswise to longitudinal axis 3 of symmetry) through a cutting station defined by cutting unit 1 and by a known conveyor drum 4.

Conveyor drum 4 rotates continuously about an axis 5 perpendicular to the FIG. 1 plane, and comprises a number of peripheral seats 6, each for retaining a respective cigarette portion 2 parallel to axis 5. Drum 4 comprises a central groove 7 which, at the cutting station, engages a circular blade 8 rotating continuously about a respective central axis 9, parallel to axis 5, to cut cigarette portions 2.

Figure 2:
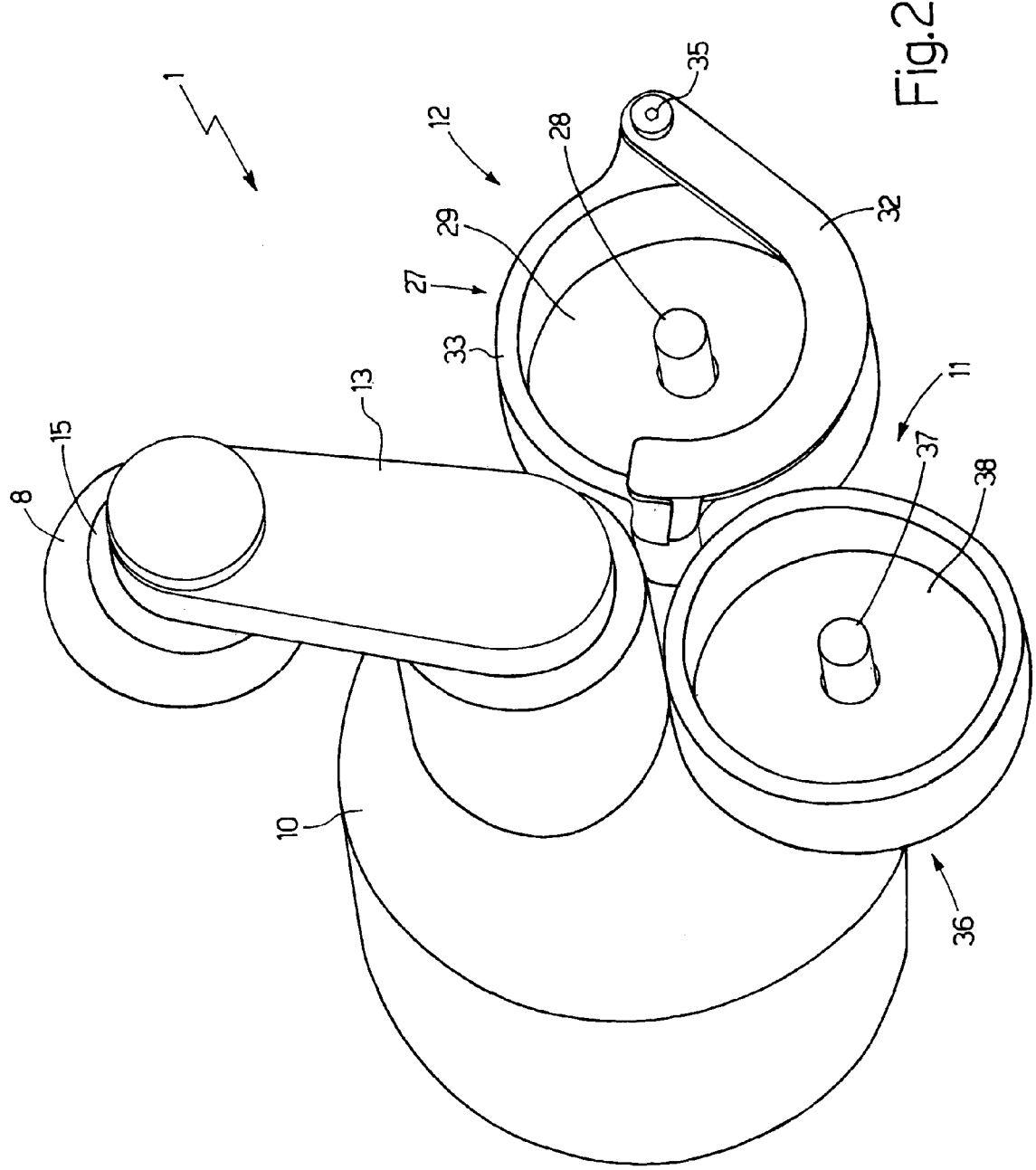
FIG. 2 shows a view in perspective of the FIG. 1 cutting unit.

As shown in FIGS. 1 and 2, cutting unit 1 comprises a cylindrical supporting body 10 supporting, in a fixed position, a store 11 for worn circular blades 8, and a store 12 for new circular blades 8. Cylindrical body 10 is connected to an arm 13 mounted to rotate about an axis 14 parallel to axis 5, and to make small axial movements in a direction parallel to axis 5. A free end of arm 13 is fitted with a gripping head 15 for supporting the circular blade 8, and rotation of arm 13 about axis 14 moves gripping head 15 between a work position (FIGS. 1 and 2), in which the circular blade 8 carried by gripping head 15 engages drum 4 to cut cigarette portions 2; an unloading position (FIG. 5), in which head 15 faces store 11 to unload the corresponding circular blade 8 into store 11; and a feed position (FIG. 4), in which head 15 faces store 12 to receive a new circular blade 8.

Figure 3:
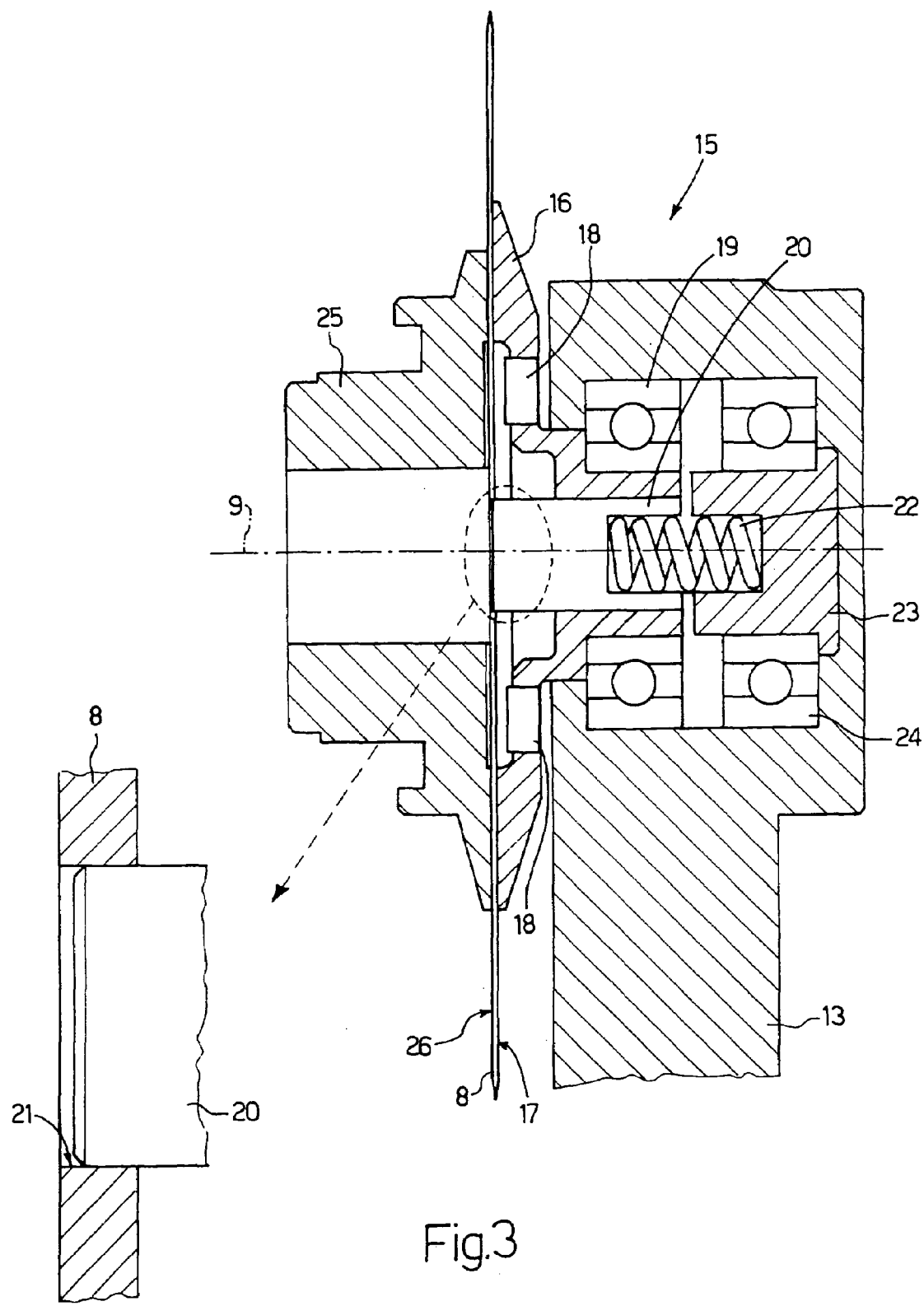
FIG. 3 shows a larger-scale section of a gripping head of the FIG. 1 cutting unit in a work position.

As shown in FIG. 3, gripping head 15 comprises a cup-shaped body 16 for engaging a surface 17 of circular blade 8, and which has four permanent magnets 18 (only two shown in FIG. 3) facing surface 17 to magnetically attract and hold circular blade 8 on cup-shaped body 16. It is important to note that permanent magnets 18 are mounted so as never to come into direct contact with surface 17 of circular blade 8, and so prevent magnetic bonding. Cup-shaped body 16 is connected mechanically to the end of arm 13 by the interposition of a ball bearing 19, so that gripping head 15 is fitted adaptably to arm 13 and allowed to oscillate freely by small amounts about axes perpendicular to axis 9 of circular blade 8 engaged by gripping head 15.

Gripping head 15 comprises a central pin 20 which engages a corresponding central hole 21 in circular blade 8 engaged by gripping head 15. Central pin 20 has a truncated-cone-shaped tip, so that it is self-centring with respect to hole 21, and is of such an axial length as not to engage the whole length of hole 21. Pin 20 is preferably fitted to cup-shaped body 16 to slide axially, in a direction parallel to axis 9 of circular blade 8 engaged by gripping head 15, from an extracted position (FIG. 3) to a withdrawn position (not shown in detail) in opposition to a spring 22 for keeping pin 20 in the extracted position. Spring 22 is compressed between pin 20 and a retaining body 23 fitted to gripping head 15 with the interposition of a respective ball bearing 24.

At the work position, a fixed-position drive head 25 is mounted to rotate about an axis coincident with axis 9 of circular blade 8 in the work position, and is rotated by a known electric motor (not shown) to rotate circular blade 8. In the work position, gripping head 15 engages surface 17 of circular blade 8, while drive head 25 engages a surface 26 of circular blade 8, parallel to and opposite surface 17, so as to grip circular blade 8 between gripping head 15 and drive head 25.

In actual use, arm 13 is moved axially with a given force in a direction parallel to axis 9 of circular blade 8 in the work position, so as to grip circular blade 8 by said given force between drive head 25 and gripping head 15, and so ensure circular blade 8 is made angularly integral, by friction, with drive head 25 by which rotation is transmitted to circular blade 8. In actual use, gripping head 15, which is fitted idly to arm 13, is obviously also rotated by drive head 25.

Figure 4:
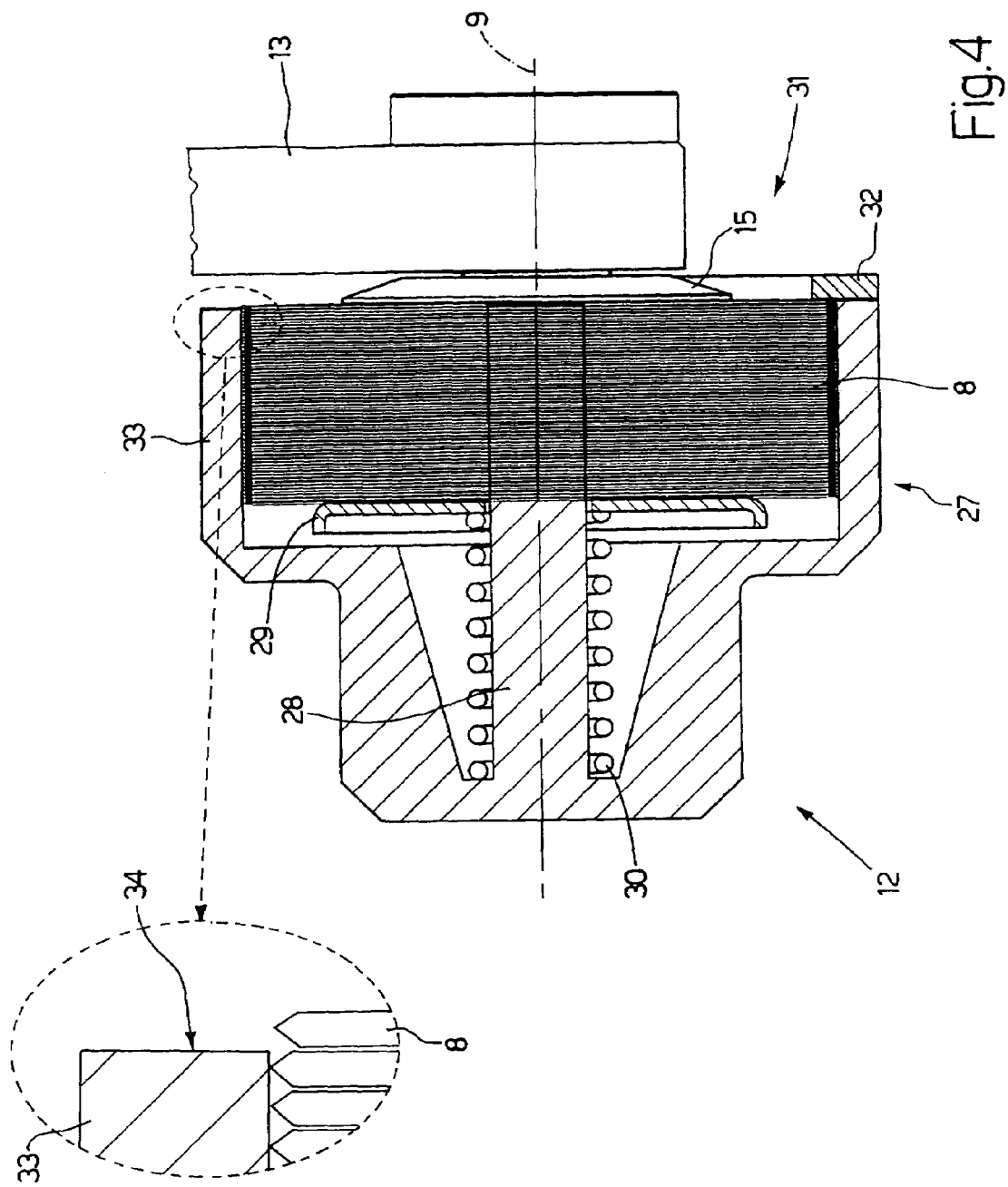
FIG. 4 shows a larger-scale section of a feed store of the FIG. 1 cutting unit.

As shown in FIG. 4, store 12 for new circular blades 8 comprises a cylindrical container 27 housing a stack of new circular blades 8 and having a central cylindrical member 28 engaging central holes 21 of circular blades 8. The stack of circular blades 8 rests on a plate 29 mounted to slide freely along cylindrical member 28, and pushed by a spring 30 towards a withdrawal opening 31 of store 12. Withdrawal opening 31 is partly closed by a half-moon-shaped stop member 32 (shown more clearly in FIGS. 1 and 2) for retaining the stack of circular blades 8 inside store 12 in opposition to the thrust of spring 30. The lateral wall 33 of cylindrical container 27 is of different heights. In particular, the portion of lateral wall 33 not engaged by stop member 32 is slightly smaller in height than the portion of lateral wall 33 engaged by stop member 32, so as to define a withdrawal region 34 through which the new circular blade 8 contacting stop member 32 (i.e. on top of the stack of circular blades 8) can be withdrawn, in a direction parallel to itself, from container 27. Stop member 32 is preferably hinged to container 27 to rotate about a pin 35 between a work position (FIGS. 1 and 2), in which the stop member partly closes withdrawal opening 31, and a loading position (not shown in detail), in which the stop member opens withdrawal opening 31 completely to permit insertion of a new stack of new circular blades 8 inside container 27.

Figure 5:
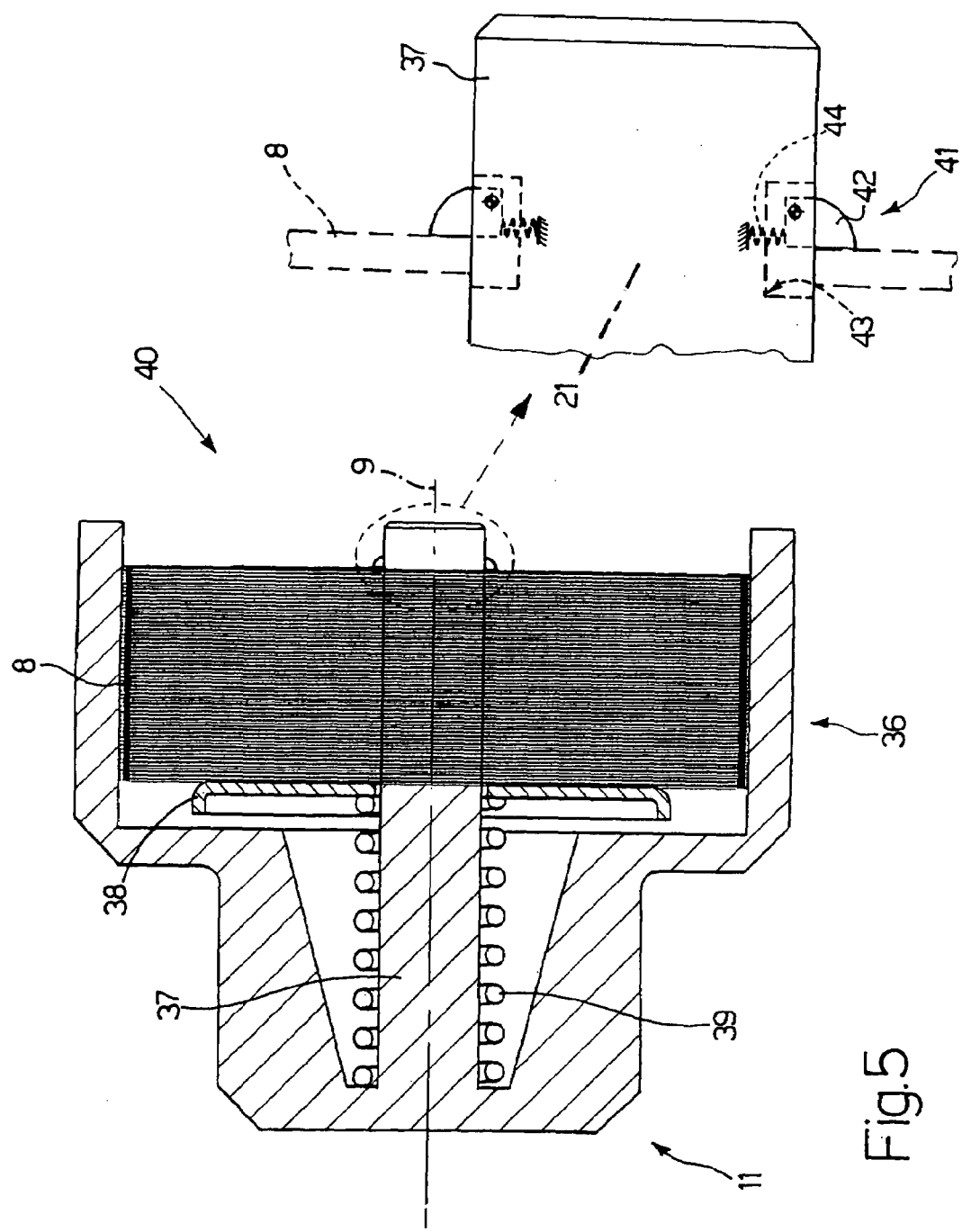
FIG. 5 shows a larger-scale section of an unloading store of the FIG. 1 cutting unit.

As shown in FIG. 5, store 11 for worn circular blades 8 comprises a cylindrical container 36 housing a stack of worn circular blades 8 and having a central cylindrical member 37 engaging central holes 21 of circular blades 8. The stack of circular blades 8 rests on a plate 38 mounted to slide freely along cylindrical member 37, and pushed by a spring 39 towards an insertion opening 40 of store 11. Close to insertion opening 40, cylindrical member 37 has a one-way retaining device 41 by which circular blades 8 are prevented from sliding towards insertion opening 40 but allowed to slide in the opposite direction, i.e. from insertion opening 40 towards plate 38. More specifically, retaining device 41 comprises a number of members 42 (two of which are shown in FIG. 5) hinged to cylindrical member 37 to rotate between an extracted position (FIG. 5) preventing circular blades 8 from sliding along cylindrical member 37, and a withdrawn position (not shown) housed entirely inside respective seats 43 in cylindrical member 37, and so allowing circular blades 8 to slide along cylindrical member 37. Each member 42 is connected to a respective spring 44 for keeping member 42 in the extracted position; and each member 42 and respective seat 43 are so formed that the switch from the extracted to the withdrawn position is only made by the thrust exerted by a circular blade 8 moving from insertion opening 40 towards plate 38, and not by the thrust exerted by a circular blade 8 moving from plate 38 towards insertion opening 40.

Figure 6:
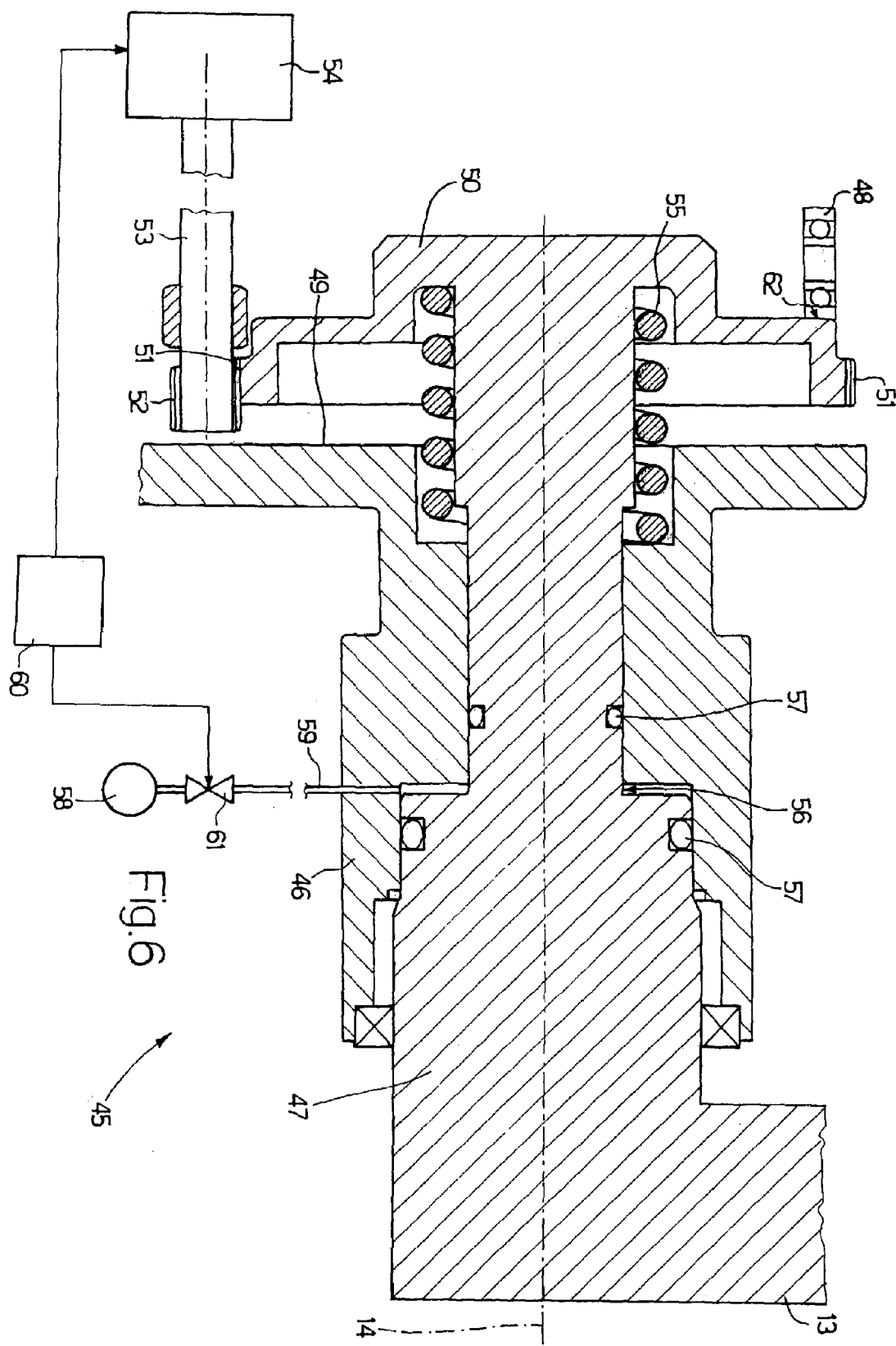
FIG. 6 shows a larger-scale section of an actuating device of the FIG. 1 cutting unit.

As shown in FIG. 6, cylindrical body 10 houses an actuating device 45 supporting arm 13, and which provides for both rotating arm 13 about axis 14, and making small axial movements of the arm in a direction parallel to axis 14. Actuating device 45 comprises a fixed frame 46 integral with cylindrical body 10; and a shaft 47 supporting arm 13 and fitted to frame 46 to rotate with respect to frame 46 about axis 14, and to move axially, with respect to frame 46 and in a direction parallel to axis 14, between two limit positions: a withdrawn limit position (FIG. 6) defined by a stop member 48 defined a bearing, and an extracted limit position (not shown in detail) defined by a stop member 49 defined by a wall of frame 46.

Shaft 47 is fitted at one end with arm 13, and is fitted rigidly at the opposite end with a cup-shaped body 50 having an outer ring gear 51 which meshes with a pinion 52 integral with a shaft 53 of an electric motor 54. More specifically, the axial dimension of pinion 52 is greater than that of ring gear 51, so that pinion 52 and the ring gear continue to mesh even when shaft 47 is moved axially between said two limit positions.

A spring 55 is compressed between cup-shaped body 50 and frame 46 to keep shaft 47 in the withdrawn limit position with a given force. More specifically, spring 55 pushes cup-shaped body 50 against bearing 48 defining the stop member defining the withdrawn limit position; in which position, cup-shaped body 50 can be rotated about axis 14 by electric motor 54, and slide freely on bearing 48 with no noticeable friction.

An airtight chamber 56 is defined between shaft 47 and frame 46, is bounded by two elastic sealing rings 57, and is connectable to a pump 58 by an annular conduit 59 to be filled with pressurized fluid (typically compressed air) by which to exert thrust on shaft 47 in opposition to that of spring 55. In actual use, compressed air is fed into airtight chamber 56 both to lessen the thrust exerted on shaft 47 by spring 55, and to completely overcome the thrust exerted on shaft 47 by spring 55, so as to move the shaft from the withdrawn limit position to the extracted limit position.

One control unit 60 controls both electric motor 54, to control rotation of shaft 47 about axis 14, and a three-way valve 61 regulating annular conduit 59 to control axial displacement of shaft 47 in a direction parallel to axis 14. Three-way valve 61 provides for connecting airtight chamber 56 to pump 58, to increase the pressure inside airtight chamber 56; for isolating airtight chamber 56, to keep the pressure inside airtight chamber 56 constant; and for connecting airtight chamber 56 to the outside, to reduce the pressure inside airtight chamber 56.

Operation of cutting unit 1 will now be described, as of a normal operating condition in which a circular blade 8 is set to the work position to cut cigarette portions 2.

In the work position, circular blade 8 is gripped between gripping head 15 and drive head 25 with a force equal to the thrust exerted by spring 55, on account of airtight chamber 56, in this situation, being maintained at ambient pressure, and is rotated about its central axis 9 by drive head 25 as described previously. When the circular blade 8 in the work position wears out, drive head 25 is stopped, and airtight chamber 56 is filled with compressed air to move shaft 47, and therefore arm 13, axially from the withdrawn to the extracted position, and so detach the circular blade 8 carried by gripping head 15 from drive head 25. It is important to note that circular blade 8 is held on gripping head 15 by the magnetic attraction exerted by permanent magnets 18 of gripping head 15.

Arm 13 is then rotated about axis 14 to move gripping head 15 from the work position to the unloading position (FIG. 5), in which head 15 faces store 11 to unload circular blade 8 into store 11. Once gripping head 15 carrying the worn circular blade 8 is positioned facing insertion opening 40 of store 11, arm 13 and gripping head 15 are moved axially in a direction parallel to axis 14 to insert the worn circular blade 8 inside container 36. When so doing, pin 20 of gripping head 15 rests end to end on cylindrical member 37, and is pushed backwards by the reaction of cylindrical member 37 which compresses spring 22. The axial movement of gripping head 15 brings the worn circular blade 8 carried by gripping head 15 into contact with retaining device 41, which withdraws as described previously to let the worn circular blade 8 through. Arm 13 and gripping head 15 are then moved axially in the opposite direction parallel to axis 14 to extract gripping head 15 from container 36. This movement again brings the worn circular blade 8 carried by gripping head 15 into contact with retaining device 41, which this time, however, prevents the worn circular blade 8 from sliding any further towards insertion opening 40, and detaches the worn circular blade 8 from gripping head 15.

At this point, arm 13 is rotated about axis 14 to move gripping head 15 from the unloading position to the feed position (FIG. 4) in which head 15 faces store 12 to receive a new circular blade 8. Once gripping head 15 is positioned facing withdrawal opening 31 of store 12, arm 13 and gripping head 15 are moved axially in a direction parallel to axis 14, so that gripping head 15 engages the new circular blade 8 facing the withdrawal opening. At this point, arm 13 and gripping head 15 are rotated about axis 14 to move the new circular blade 8 parallel to itself and so withdraw the new circular blade 8 through withdrawal region 34.

Finally, arm 13 is rotated about axis 14 to move gripping head 15 fitted with the new circular blade 8 back into the work position.

In an alternative embodiment not shown, projections and/or depressions are formed on the wall 62 of cup-shaped body 50 mating with bearing 48, so that, in given angular positions, bearing 48 rests on the projections and/or depressions to produce small axial movements of cup-shaped body 50, and therefore of shaft 47, in a direction parallel to axis 14. This solution is particularly advantageous by permitting extremely accurate, small axial movements of shaft 47 in given angular positions of shaft 47.

As described above, cutting unit 1 provides for transversely cutting cigarette portions on a filter assembly machine, but may obviously also be used for cutting any other similar product, and in particular for cutting a portion of filter material.

The invention claimed is:

1. A method of transversely cutting cigarette portions (2) on a filter assembly machine, the method comprising
   cutting a cigarette portion (2) by feeding the cigarette portion (2) transversely of its length through a cutting station to intercept a circular blade (8) rotating continuously about a first axis (9) parallel to length of the cigarette portion (2), the method being characterized by:
   supporting the circular blade (8) by an arm (13);
   moving the arm (13) between a work position, in which the circular blade (8) cuts the cigarette portions (2), an unloading position facing a first store (11) configured for storing a plurality of worn circular blades (8), and a feed position facing a second store (12) configured for storing a plurality of new circular blades (8);
   unloading the circular blade (8) from the arm (13) to the first store (11) at the unloading position by using the arm (13) to transfer the circular blade (8) from the arm (13) to the first store (11), and
   loading a new circular blade (8) from the second store (12) onto the arm (13) at the feed position by using the arm (13) to transfer the new circular blade (8) from the second store (12) onto the arm (13).

2. A method as claimed in claim 1, wherein the step of moving the arm (13) between the work position, the unloading position, and the feed position is performed by rotating the arm (13) about a second axis (14) parallel to the first axis (9) of rotation of the circular blade (8).

3. A method as claimed in claim 1, wherein the arm (13) supports a gripping head (15) which engages a first surface (17) of the circular blade (8) and in the work position, engaging a second surface (26) of the circular blade (8), opposite and parallel to the first surface (17), by a drive head (25), so as to grip the circular blade (8) between the drive head (25) and the gripping head (15).

4. A method as claimed in claim 3, wherein the drive head (25) is rotated about the first axis (9) by a motor, whereas the gripping head (15) is fitted idly to the arm (13), so that the circular blade (8) is rotated about the first axis (9) by the drive head (25).

5. A method as claimed in claim 3, wherein, in the work position, the arm (13) is moved axially by a given force in a direction parallel to the first axis (9), so as to grip the circular blade (8) by said given force between the drive head (25) and the gripping head (15).

6. A method as claimed in claim 1, wherein, during the movements of the arm (13), the circular blade (8) is held on the gripping head (15) of the arm (13) by the action of at least one magnet (18) integral with the gripping head (15) and facing the circular blade (8).

7. A method as claimed in claim 1, wherein the step of unloading the circular blade (8) from the arm (13) to the first store (11) is performed by rotating the arm (13) about the second axis (14) to position the circular blade (8) so that it is facing an insertion opening (40) of the first store (11), and by moving the arm (13) in a direction parallel to the first axis (9) so that the circular blade (8) engages one-way retaining means (41).

8. A method as claimed in claim 1, wherein the step of loading a new circular blade (8) from the second store (12) onto the arm (13) is performed by rotating the arm (13) about the second axis (14) to position a gripping head (15) of the arm (13) so that it is facing a withdrawal opening (31) of the second store (12), moving the arm (13) in a direction parallel to the first axis (9) so that the gripping head (15) engages a new circular blade (8) facing the withdrawal opening (31), and rotating the gripping head (15) about the first axis (9) to withdraw the new circular blade (8).

9. A unit for transversely cutting cigarette portions (2) on a filter assembly machine, the unit comprising
   a rotary circular blade (8) rotating continuously about a first axis (9) and located at a cutting station, and
   a conveyor (4) for positioning a cigarette portion (2) so that its length is parallel to the first axis (9) and for feeding the cigarette portion (2) transversely of its length through the cutting station to intercept the rotary circular blade (8),
   the unit being characterized by:
   a first store (11) configured for storing a plurality of worn circular blades (8);
   a second store (12) configured for storing a plurality of new circular blades (8);
   an arm (13) supporting the circular blade (8); and
   actuating means (45) for moving the arm (13) between a work position, in which the circular blade (8) cuts the cigarette portions (2), an unloading position facing the first store (11), in which the circular blade (8) is unloaded from the arm (13) to the first store, and a feed position facing the second store (12), in which a new circular blade (8) is loaded from the second store (12) onto the arm (13);
   wherein in the unloading position, the actuating means (45) further moves the arm (13) to transfer the circular blade (8) from the arm (13) to the first store (11), and in the feed position, the actuating means (45) further moves the arm (13) to transfer the new circular blade (8) from the second store (12) onto the arm (13).

10. A unit as claimed in claim 9, wherein the actuating means (45) rotates the arm (13) about a second axis (14) parallel to the first axis (9) of rotation of the circular blade (8) to move the arm (13) between the work position, the unloading position, and the feed position.

11. A unit as claimed in claim 10, wherein the actuating means (45) moves the arm (13) in a direction parallel to the second axis (14).

12. A unit as claimed in claim 11, wherein the actuating means (45) comprises a fixed frame (46), and a shaft (47) which supports the arm (13) and is fitted to the fixed frame (46) to rotate about the second axis (14) with respect to the fixed frame (46), and to move axially, with respect to the fixed frame (46) and in a direction parallel to the second axis (14), between two limit positions defined by two respective stop members (48, 49); the actuating means (45) also comprising an elastic member (55) compressed between the fixed frame (46) and the shaft (47) to keep the shaft (47) contacting a first stop member (48) with a given force, and an airtight chamber (56) defined between the shaft (47) and the fixed frame (46), which can be filled with pressurized fluid to produce thrust on the shaft (47) in opposition to the thrust exerted by the elastic member (55).

13. A unit as claimed in claim 12, wherein the shaft (47) comprises a cup-shaped member (50) fitted rigidly to the shaft (47) at the opposite end with respect to the arm (13), wherein the shaft (47) defines a support for the elastic member (55), and wherein the cup-shaped member (50) comprises an outer ring gear (51); a first electric motor (54) being provided to power the cup-shaped member (50) via the outer ring gear (51) of the cup-shaped member (50).

14. A unit as claimed in claim 12, wherein the first stop member (48) is defined by a bearing.

15. A unit as claimed in claim 9, wherein the arm (13) comprises a gripping hand (15) which engages a first surface (17) of the circular blade (8); a drive head (25) being provided in a fixed position at the work position, and engaging a second surface (26) of the circular blade (8), opposite and parallel to the first surface (17), so as to grip the circular blade (8) between the drive head (25) and the gripping head (15).

16. A unit as claimed in claim 15, is configured to be rotated the drive head (25) about the first axis (9); the gripping head (15) being fitted idly to the arm (13) so that the circular blade (8) is rotated about the first axis (9) by the drive head (25).

17. A unit as claimed in claim 15, wherein the gripping head (15) comprises a central pin (20) for engaging a corresponding central hole (21) in the circular blade (8).

18. A unit as claimed in claim 17, wherein the pin (20) of the gripping head (15) is fitted to the gripping head (15) to slide axially between an extracted position and a withdrawn position in opposition to elastic means (22) maintaining the pin (20) in the extracted position.

19. A unit as claimed in claim 15, wherein the gripping head (15) comprises a magnet (18) positioned facing a surface of the circular blade (8) engaged by the gripping head (15), so as to hold the circular blade (8) on the gripping head (15).

20. A unit as claimed in claim 9, wherein the first store (11) comprises a first cylindrical container (36) for housing the worn circular blades (8), wherein the first cylindrical container (36) has a first central cylindrical member (37) engaging a corresponding central hole (21) in each of the worn circular blades (8), and has one-way retaining means (41) for retaining the worn circular blades (8) in the first cylindrical container (36).

21. A unit as claimed in claim 9, wherein the second store (12) comprises a second cylindrical container (27) for housing the new circular blades (8), wherein the second cylindrical container (27) has a second central cylindrical member (28) engaging a corresponding central hole (21) in each of the new circular blades (8), has a stop member (32) partly closing a withdrawal opening (31) of the second store (12), and has a push device (30) for keeping the new circular blades (8) inside the second container (27) pressed against the stop member (32), the second cylindrical container (27) having a lateral withdrawal region (34), through which one of the new circular blades (8), positioned contacting the stop member (32), can be withdrawn from the second cylindrical container (27) in a direction parallel to the new circular blade (8).

* * * * *